Sept. 7, 1943.　　　F. W. BURGER　　　2,329,099
TRAILER AXLE
Filed April 19, 1940　　　2 Sheets-Sheet 1
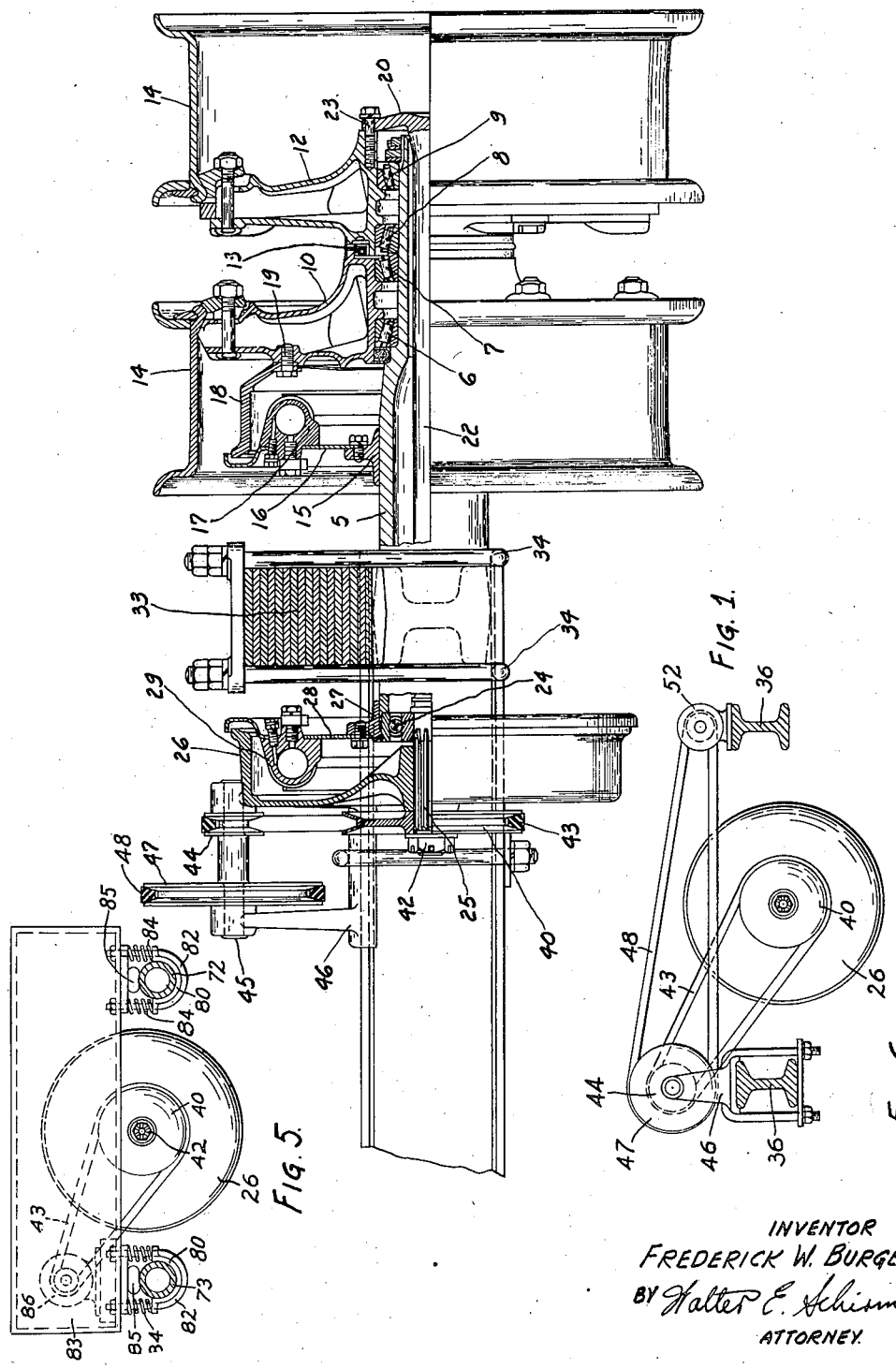
INVENTOR
FREDERICK W. BURGER.
BY Walter E. Schirmer
ATTORNEY.

Sept. 7, 1943.   F. W. BURGER   2,329,099
TRAILER AXLE
Filed April 19, 1940   2 Sheets-Sheet 2
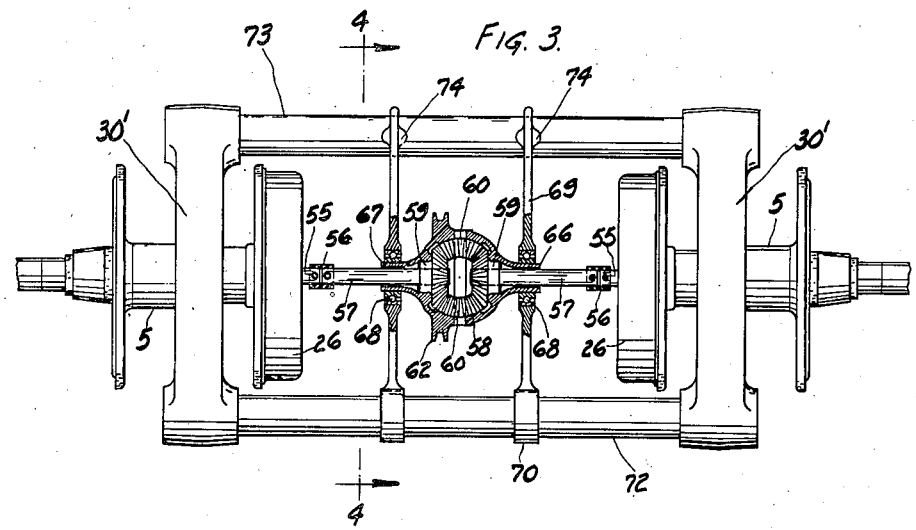
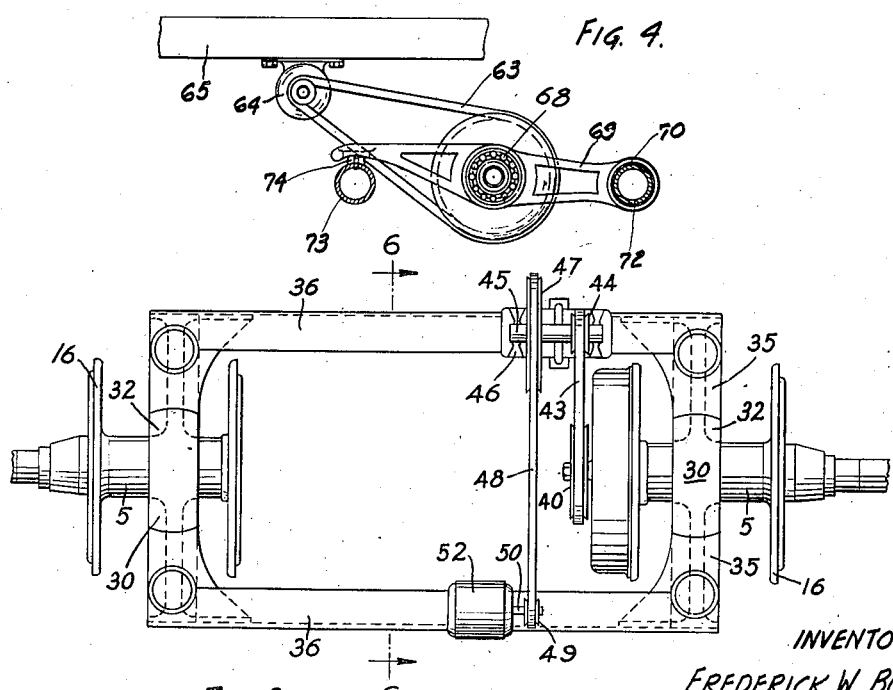
INVENTOR
FREDERICK W. BURGER
BY Walter E. Schirmer
ATTORNEY.

Patented Sept. 7, 1943

2,329,099

UNITED STATES PATENT OFFICE 2,329,099

TRAILER AXLE

Frederick W. Burger, Niles, Mich., assignor to Clark Equipment Company, Buchanan, Mich., a corporation of Michigan Application April 19, 1940, Serial No. 330,454

9 Claims. (Cl. 74—11)

This invention relates to trailer axles, and more particularly is directed to an improvement and addition to the construction shown in the copending application of Burton L. Mills, Serial No. 272,085, filed May 6, 1939.

The present invention has for its primary object the provision of a power take-off on a trailer axle assembly which may be utilized for driving a generator carried either on the axle or the body of the vehicle, or for driving any suitable mechanism, such as a fan, blower, charging equipment, or similar mechanism which requires power.

In the aforementioned copending application, a coordinating wheel structure is provided in which the dual wheels at each side of the trailer are mounted for independent relative rotation and have separate independent braking means, the wheels and braking means being supported on suitable axle spindles which are interconnected through a spring pad casting by means of cross tubes forming a rectangular opening intermediate the wheels. The present invention contemplates the utilization of this opening for taking off power from one of the brake shafts and transmitting it to mechanism mounted either upon the cross arms of the axle suspension or mounted on the vehicle.

Since, by reason of the present axle construction, the brake drum shaft for the outboard wheel has one end thereof disposed intermediate the two cross arms of the axle assembly and is rotating at all times that the vehicle is moving, power can be taken from this shaft and applied through any suitable transmitting system to a remotely disposed generator, blower, or similar power driven equipment. It is also contemplated that power from both of the oppositely disposed wheels can be utilized through the incorporation of a differential structure between the two adjacent ends of the brake shafts inasmuch as these brake shafts rotate at different speeds, depending upon the turning radii of the trailer, this being an important function of the axle structure per se, to eliminate tire scuffing and undue tire wear in turning corners and parking the trailer.

It is of course to be understood that suitable clutch means may be interposed in the driving connection at any convenient point, if so desired, so that the operator may control the power output in the power take-off mechanism, as desired.

Other objects and advantages of the present invention will appear more fully from the following detailed description which, taken in conjunction with the accompanying drawings, will disclose to those skilled in the art the particular construction and operation of preferred forms of the present invention.

In the drawings:

Figure 1 is an elevational view, partly in section, of a portion of the axle assembly embodying the present invention.

Figure 2 is a top plan view, with the wheels eliminated, of the trailer axle shown in Figure 1;

Figure 3 is a corresponding top plan view of a modified form of construction utilizing a differential action between the two brake shafts;

Figure 4 is a sectional view taken substantially on line 4—4 of Figure 3;

Figure 5 is a corresponding sectional view of a modified form of structure in which the mechanism to be driven is supported upon the axle cross tubes; and Figure 6 is a sectional view taken on line 6—6 of Figure 2.

Referring now in detail to the drawings, in Figure 1 I have disclosed an axle spindle, indicated generally at 5, which has its outer end swaged down to provide seats for bearings 6, 7, 8 and 9, which are adapted to rotatably support the wheel spiders 10 and 12 about the outboard end of the spindle. The adjacent hub portions of the wheel spiders 10 and 12 are provided with suitable means 13 providing an effective lubricant seal therebetween, while accommodating relative rotation therebetween. Mounted upon each of the spiders 10 and 12 is a tire carrying rim 14 which may be of conventional design and mounted upon the spiders through the use of clamping lugs in any usual or desired manner.

Pressed onto the enlarged portion of the spindle 5 is a brake flange 15 which may be welded in position and which is adapted to carry the backing plate 16 upon which is supported suitable brake actuating mechanism 17, which may be either hydraulically or pneumatically operated. The brake mechanism 17 is adapted to have braking engagement with the brake drum 18, having the brake head flange thereof secured by means of the studs 19 to the inboard side of the inboard wheel 10. The outboard wheel spider 12 has the flanged end 20 of a brake shaft 22 secured thereto by means of the studs 23. The shaft 22 extends through the spindle 5 and is provided with bearing support in the inner end of the spindle by means of the ball bearing assembly 24. The projecting end of the shaft is splined as indicated at 25 to receive the brake drum 26, which is thereby keyed for conjoint rotation with the wheel spider 12. Mounted upon the end of the spindle 5 is a brake flange 27 carrying the backing plate 28 which in turn supports suitable brake mechanism 29 adapted to cooperate with the brake drum 26 to apply braking torque to the wheel spider 12. Intermediate the flanges 27 and 15, the spindle 5 is adapted to support a spring pad casting, indicated generally at 30, comprising a spring supporting portion 32 upon which is mounted the leaf spring 33 secured thereto by means of the usual U-bolts 34. Extending transversely of the spindle 5, the casting is provided with arm portions 35 which, at their ends are adapted to receive channel shaped cross arms 36 which rigidly tie the two castings 30 together and thereby prevent relative rotation therebetween forming a rigid transverse axle structure with the spindles 5 rigidly secured in the castings 30 upon which the load of the vehicle is applied.

Referring again to Figure 1, the spline portion 25 of the shaft 22 is provided at its end with the pulley 40 preferably of the grooved type, which is also splined for conjoint rotation with the shaft 22. The pulley and brake drum are held in position on the splines 25 by means of the end nut 42 to prevent axial shifting thereof. The grooved pulley 40 is adapted to receive a V-belt 43 which is trained thereover and which connects the pulley 40 to a second pulley 44 mounted upon a lay-shaft 45 carried by means of the bracket 46 upon one of the cross arms 36. The shaft 45 is provided adjacent its inboard end with a second pulley 47 of a diameter considerably greater than the pulley 44. The second pulley 47 is adapted to have trained thereover a V-belt 48 which, at its opposite end, is connected to the driven pulley 49 carried on the shaft 50 of a generator 52. This generator in turn may be employed for driving suitable electrical apparatus to be used in the trailer, such as an electric circuit for signal lights or the like, or a motor for an air conditioning unit, fan blower or similar mechanism.

It will be apparent that in place of the generator 52, the trailer could be provided with any suitable means, such as a blower or the like driven in a similar manner from the brake shaft 22 through the pulley connections or through any other suitable type of driving connections, such as a chain drive, enclosed gear drive, or the like, or, if desired, the construction shown in Figure 2 could be duplicated on the opposite side of the axle and secondary means could also be driven from the corresponding brake shaft of the left-hand side of the axle, as viewed in Figure 2. This might be desirable to drive separate generators for a lighting system and a ventilating system, or for driving compressors or similar mechanisms.

When it is desired to use the torque from both of the brake shafts to drive auxiliary mechanism, a differential mechanism such as shown in Figures 3 and 4 may be employed. In this type of construction the brake shafts 55 upon which are carried the brake drums 26 are provided with coupling means 56, which may be in the form of universal joints or flexible sleeves, or similar flexible motion transmitting means by which the ends of the shafts 55 are connected to torque shafts 57 extending into the differential case 58. In this case, the shafts 57 are in splined engagement with side pinions 59, which in turn have meshing engagement with pinion 60 to provide the differential action. The differential case 58 is provided with the grooved pulley portion 62 adapted to receive a belt drive 63 for driving a generator, such as the generator 64 carried on the bottom or floor 65 of the trailer body.

The differential case is provided with oppositely extending tubular sleeve portions 66 and 67 which are journalled in bearings 68 carried by transversely extending cross arms 69 journalled at the enlarged end 70 thereof upon the cross tube 72 extending between the two spring pad castings 30', and at the opposite end having cushioned engagement on the cross tube 73 by means of rubber biscuits 74 or the like. In this manner, the differential is resiliently supported between the cross tubes and the brake shafts are flexibly connected thereto so as to accommodate the slight movement of the differential which may be produced during operation of the vehicle. The relative jouncing of the truck body 65 relative to the axle assembly does not affect the driving relation in any substantial manner, as will be apparent from an inspection of Figure 4 since it will be noted that relative vertical movement of the body 65 produces no appreciable change in the length of the belt drive within the limits of normal movement.

With such a construction it will be at once apparent that the torque of both of the axle shafts is employed to drive the pulley 62, and consequently a greater amount of power can be taken off from such a drive. Due to the fact that the wheels at opposite sides of the vehicle may have relative rotation when turning the vehicle, the differential mechanism is necessary to accommodate such relative rotation.

In the embodiment of the invention shown in Figure 5, the cross tubes 72 and 73 of the axle assembly are provided with U-shaped brackets 80, which in turn provide supports for U-shaped bolts 82 extending upwardly to support thereon a compartment 83 adapted to contain air conditioning equipment or the like. The compartment 83 is mounted for resilient movement between the two brake drums 26 by means of the springs 84 carried on the bolts 82, which resiliently support the housing 83 on the cross tubes. Suitable rubber cushioning means 85 may also be interposed between the base of the housing and the cross tubes for noise insulating purposes, as well as for additional cushioning action. The brake shaft is adapted to carry at its inner end the pulley 40 which, through the belt drive 43, is adapted to operate a generator, such as that indicated at 86, disposed at one side of or within the housing 83, which generator or similar power mechanism may be employed to operate suitable air conditioning equipment or refrigerating equipment within the housing 83, or, if desired, in place of the generator 86 a fan or blower may be driven by this mechanism.

It is therefore believed apparent that the present invention provides a novel type of axle assembly and power take-off combination whereby torque can be obtained from the dead axle or trailing axle assembly and can be applied to drive suitable electrical mechanisms, blowers, or any other similar power driven equipment. The installation of such equipment in an axle assembly of the present type is simple and occupies no space that is otherwise required since the particular type of axle assembly provides a large amount of space between the two axle spindles. A further advantage is that the mechanism is always available for inspection, replacement and repair.

I do not intend to be limited to the exact details herein shown and described, but only insofar as defined by the scope and spirit of the appended claims.

I claim:

1. In a non-driving trailer axle assembly including axially spaced alined axle spindles, bracket means receiving said spindles and rigidly connected together through a pair of laterally offset cross arms, wheels mounted on the remote ends of said spindles, a shaft connected at one end to one of said wheels and extending through and projecting inwardly of the inner end of the associated spindle, and power takeoff means connected to the inner end of said shaft.

2. The assembly of claim 1 wherein said power takeoff means includes means mounted on one of said cross arms and receiving torque from said shaft.

3. The assembly of claim 1 further characterized in the provision of a power-driven device mounted on one of said cross arms and driven from said power takeoff means.

4. The assembly of claim 1 further characterized in the provision of a pair of pulleys on one of said cross arms, a power device on the other cross arm, driving means between one of said pulleys and said power takeoff means, and driving means between the other pulley and said device.

5. In a non-driving trailer axle assembly including a pair of stationary axle spindles, a pair of laterally offset cross arms, transverse members extending between the ends of said cross arms and rigidly connected thereto, said members supporting said spindles intermediate the ends of said spindles, a pair of wheels rotatably mounted on the outer end of each spindle, a shaft extending through one of said spindles and connected to one of said wheels mounted on the spindle, and power takeoff means supported on said cross arms and driven from said shaft upon rotation of said one wheel.

6. The assembly of claim 5 wherein said power takeoff means includes means resiliently supporting the same on at least one of said cross arms.

7. The combination, with a pair of laterally offset parallel cross arms, rigid transverse members interconnecting the ends of said arms to form a rectangular frame, stationary axle spindles rigidly supported in said members intermediate the ends thereof, and a wheel rotatably mounted on the outer end of each spindle, of a shaft projecting through one of said spindles and connected at its outer end to said wheel, the inner end of said shaft terminating inwardly of said spindle, and means supported on said cross arms and including an actuating mechanism driven from the inner end of one of said shafts.

8. The combination of claim 7 further characterized in the provision of a pulley on the inner end of said shaft, and belt drive means between said pulley and said actuating mechanism.

9. In a non-driving trailer axle assembly, a pair of laterally spaced parallel cross members having rigid transverse members at the ends thereof to form a rigid rectangular frame, alined axle spindles supported in said transverse members, a wheel journalled on the outer end of each spindle, a shaft extending through one of said spindles and connected at one end to one of said wheels, a power driven device supported on one of said cross arms, and driving means connected between the end of said shaft and said device.

FREDERICK W. BURGER.